Feb. 14, 1961    J. SCHULEIN    2,971,852
TEMPERATURE TELLTALE
Filed July 23, 1956

INVENTOR.
Joseph Schulein
BY Ramsey and Kolisch
Attys.

United States Patent Office 2,971,852
Patented Feb. 14, 1961

2,971,852
TEMPERATURE TELLTALE
Joseph Schulein, P.O. Box 212, Corvallis, Oreg.
Filed July 23, 1956, Ser. No. 599,497
12 Claims. (Cl. 99—192)

This invention relates to a thermosensitive indicator which will record if a temperature rise has occurred, and more particularly concerns a telltale device which indicates such a change by means of a readily noticeable change occurring in the device.

It is known that frozen foods should be kept below certain maximum temperatures to prevent the loss of flavor and the production of undesirable odors and textures therein. If frozen foods are permitted to thaw, spoilage occurs quite rapidly thereafter. Even when maintained in frozen condition, flavor changes occur in some foods if the temperature is allowed to rise above a certain maximum temperature. This temperature varies depending on the type of frozen food. It is therefore of prime importance that the seller as well as the purchaser of frozen food know whether, at any time since original freezing, food has been exposed to temperatures which would tend to spoil or deleteriously affect the food.

Various indicators have been suggested in the past, yet to my knowledge none have been found to be completely satisfactory and commercially acceptable. Some of the indicators which have been proposed, for instance, have been characterized by their cumbersome size, or such an intricate construction that they are highly impracticable. Other indicators, while easily manufactured, have tended to be unreliable and inaccurate. Still others have utilized the escape of material from the indicator, which created an unsightly appearance and tended to contaminate the surroundings. In some instances, the use of toxic materials has been suggested which is an inherently dangerous practice if leakage occurs.

Perhaps the most important consideration, however, is the fact that the devices heretofore known have been subject to the major defect that they must be incorporated in the package after freezing, which feature requires special handling.

Generally, it is an object of this invention to provide a thermosensitive indicator which will take care of these requirements in a highly practical and satisfactory manner. More specifically, it is an object of this invention to provide an indicator of the hereinbefore described character which is readily assembled and which will give a clear indication of predetermined temperature rise which has occurred after freezing.

Another object of my invention is to provide such an indicator which may be assembled with the item which is to be frozen under normal room temperature conditions without prior freezing, and which can then be frozen and be in condition to indicate a subsequent thaw and refreezing cycle.

Still another object of the invention is to provide an indicator which is self-contained and does not require the escape of any material therefrom, and to provide an indicator which, if desired, may be comprised solely of edible constituents so that if leakage does occur food contamination will not result.

These and other objects and advantages are attained by the present invention, various novel features of which will become more fully apparent as the following specification is read in conjunction with the accompanying drawings, wherein.

In general, this invention contemplates the use of an opaque or semiopaque emulsion which will freeze at a predetermined temperature. The emulsion, in both its frozen and unfrozen condition, is opaque or semiopaque. Emulsions, it is known, can be broken by freezing so that upon subsequent melting the emulsion will separate and the several phases of the emulsion will agglomerate into continuous liquid phases. The light diffusing or transmitting characteristics of such a mixture as employed in this invention, are substantially different from those of an emulsion containing a liquid dispersed throughout another liquid, so that the occurrence of a thaw may be readily detected when separation occurs. Subsequent freezing of the separate liquid layers will not substantially change their light transmitting characteristics so that the indicator device is irreversible in its nature.

Figure 1:
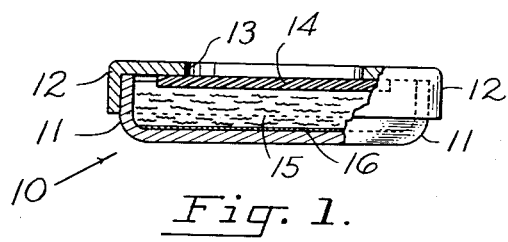
Fig. 1 is a side view in section of one form of the indicator of this invention.

Referring to the drawings, Fig. 1 illustrates one embodiment of the present invention in a form suitable for insertion into frozen food packages. In this form, the indicator generally indicated at 10 comprises a cup 11, and a lid member 12 sealed by suitable means on cup 11 so as to prevent the escape of fluid from the container. Lid member 12 has a cut-out portion 13 sealed by a layer of plastic 14, forming a window which permits visual inspection of the interior of the container. Deposited within the container is a suitable emulsion, generally indicated at 15, which is characterized by its being meltable at a certain predetermined temperature after freezing. This predetermined temperature may be varied, as explained below.

To assist in reading the telltale device of this invention, signal means are provided which will display the physical change which takes place in the emulsion. This signal means may take a variety of forms.

In the preferred form of this invention, the signal means takes the form of a colored paint coating 16 deposited on the inner surface of cup 11 opposite cut-out portion 13. The coating may be of any suitable color, such as a brilliant red or blue which would be readily discernible to the eye. In operation, when such a signal means is used, a sufficiently opaque emulsion of transparent liquids is first deposited over the coating. This emulsion is then frozen, and the frozen emulsion, because of its opaque properties, serves to continue to mask the coating 16 so that what is seen through window 13 is the color (preferably whitish) of the emusion employed. When the emulsion is broken by freezing and subsequent thawing, the transparent or translucent properties of the continuous liquid phases which result permit the inner surface of cup 11 and coating 16 to be seen, so that a color change is discernible from looking through cut-out portion 13. Telltale devices may be constructed in this manner which afford a very definite color change.

Another signal means which has been found to be highly valuable is the use of a dyestuff which is soluble in the dispersed liquid of the emulsion. Emulsions may be prepared, for example, of the oil in water type, which have incorporated in the continuous water phase an oil soluble dye. This type of emulsion will be relatively color stable at room temperature, and color stable for an indefinite period when the emulsion is frozen. When such an emulsion is broken upon thawing, the continuous oil phase created dissolves quite readily the oil soluble dye so as to impart to the resulting mixture a color conforming substantially to the color of the dye. Such a signal means has the advantage that no backing need be specially prepared for use with the emulsion. However, emulsions prepared in this manner should, of course, be used after their preparation, before the dye dissolves in the oil.

A color change can also be effected by freezing and thawing an emulsion which has a dyestuff dissolved in one of the liquids of the emulsion only. The presence in the emulsion of another liquid which is substantially untinted, and the light disbursing characteristics of emulsions in general, cause this type of emulsion to have a different shade in its emulsified state than it does when the emulsion is broken into continuous liquid phases.

Likewise, a dyestuff soluble in the oil phase can be deposited on an inner surface of the container to be dissolved by the oil phase when the emulsion breaks.

It is obvious that a wide variety of emulsions may be employed in the preparation of the telltale device of this invention, so long as the emulsions are stable enough to permit them to be frozen prior to demulsification. They should in general have light diffusing properties in an emulsified state, and be broken readily into continuous liquid phases on freezing and thawing. Such emulsions therefore include emulsions of the oil in water type, of the water in oil type, and of the oil in oil type. The particular emulsions selected for use in any individual case would depend, of course, upon the temperature rise which is to be recorded. It has been found particularly valuable in the application of this invention to materials such as frozen food stuffs to use emulsions of the oil in water type, since these ingredients are readily available, and the freezing point of the continuous water phase may be easily adjusted in quite close limits by the addition of freezing point depressants, such as salt, sugar, glycerol, etc. Also, emulsifying agents of a type producing such semiopaque or opaque emulsions are readily available.

In the manufacture of the telltale devices for use with edible foods, nontoxic ingredients are advantageously employed to insure that should accidental leakage occur, the food will not be contaminated. For instance, an emulsion prepared from an edible vegetable oil, water, and sugar would be quite satisfactory for such purposes.

In the preparation of the emulsion, emulsifiers may be desirable. These emulsifiers may be illustrated by the ordinary type of emulsifying agent, such as soap, which reduces the surface tension of the liquid, and such lyophylic colloids as gelatine, albumin, gum arabic, etc., which tend to stabilize the dispersed drops in the emulsion. In general, in the manufacture of an irreversible telltale, the emulsifiers used should not be of a type which would spontaneously or easily re-emulsify the mixture on breakage so as to produce again the original light transmitting or diffusing characteristics.

By way of example, typical oil in water emulsions have been prepared as follows: (Parts referred to are parts by weight.)

(1) An emulsion base of the oil in water type was prepared from ten parts water, 40 parts of edible vegetable oil (peanut oil), and two parts of an emulsifier, Santomerse S (a 30 percent aqueous solution of decyl benzene sodium sulfonate). This mixture was agitated vigorously, and an emulsion formed which was found to be stable at room temperatures for periods of about three days. The ratio of water and oil in the above mixture may be varied within large ranges, with the preparation of other suitable stable emulsions.

(2) In a similar manner, an emulsion was prepared from 1 part water, 7 parts mineral oil, and ¼ part Santomerse S. This emulsion was found to be stable at room temperatures for periods up to about one week. The same mixture containing ½ part of the Santomerse S was stable for several weeks.

Emulsions prepared using the proportions indicated above were placed in containers resembling the one described in Fig. 1, the inner bottom surfaces of the containers being covered with bright red coatings. The emulsions were then frozen by lowering the temperature to about 0° F. so that the water in the emulsion froze. The emulsions were almost white in color and generally opaque before and after freezing so that the colored coatings were masked thereby. When the temperature was subsequently raised to about 32° F., the emulsions thawed and broke, separating into continuous liquid phases and revealing the colored coatings. The coatings were readily discernible even upon subsequent freezing of the telltales.

In many instances, it may be desirable to deaerate the emulsion prior to its use. In this manner, foam is removed which might otherwise be objectionable, since large amounts of foam detract from the effectiveness of the invention.

The freezing temperature of the second of the above emulsions was reduced to about 15° F. upon the addition of 0.15 part of ordinary salt.

As explained hereinbefore, a modified type of telltale device may be prepared by incorporating in the emulsion an oil soluble dye. By way of example, a typical oil soluble dye base was prepared by dispersing in 5 parts of water 0.5 part of an oil soluble dye, Sudan III (tetrazobenzene-beta-naphthol). 0.5 part of Santomerse S was included in this mixture to promote dispersion of the dye. 50 parts of the emulsion base described in (1) above were intimately mixed with 0.3 part of this oil soluble dye base, and a practically white emulsion was attained, which was color stable for several hours at room temperature. The emulsion was color stable for an indefinite period when frozen, and on thawing at approximately 32° F., the resulting mixture changed to a red color.

Figures 2, 3, 4:
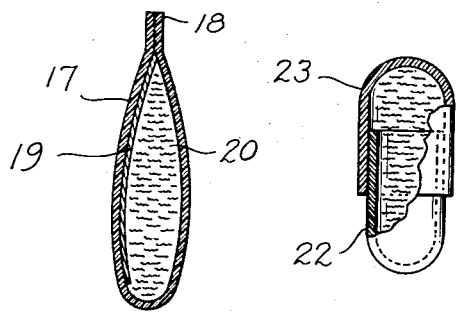
Figs. 2 and 3 are side views, also in section, of modified forms of the indicator of this invention.

Figs. 2, 3, 4, 5, and 6 illustrate modified forms of a container which may be employed in this invention. As shown in Fig. 2, the container may be a transparent envelope 17 prepared from such material as cellophane and properly sealed about its edges as at 18. The inner surface of one of the sides of the envelope may be painted, as at 19, a distinctive color, such as red, and the envelope then substantially filled with a suitable emulsion 20. It will be obvious that upon breaking of the emulsion, coating 19, which was formerly masked, will become readily discernible. In those instances where a soluble dye is used to signal the breaking of the emulsion, the container illustrated in Fig. 3 may be conveniently used. The container in Fig. 3 is the ordinary capsule comprised of transparent shell portions 22 and 23. The container in Fig. 4 has a body 30, made from a sheet of cardboard or other suitable material preferably impervious to water and containing a cutout 31. A colored sheet is bonded to one face of the body so that the color may be seen by looking through the cutout. The telltale may be assembled by filling the cutout with a suitable emulsion, and fastening a transparent sheet over the other face of the body 30.

Figure 5:
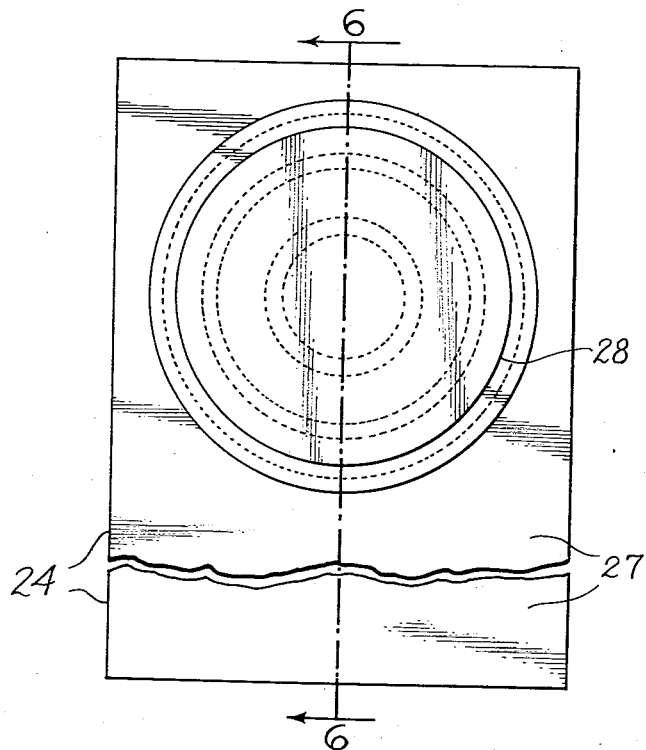
Figs. 4 and 5 are top views of other forms of indicators.
Figure 6:
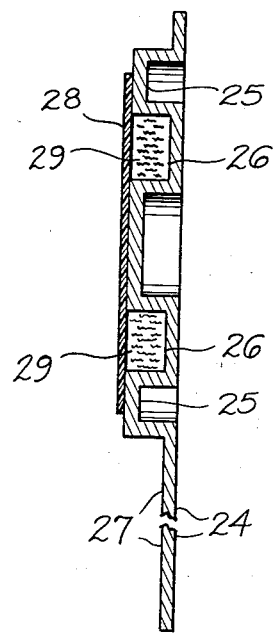
Fig. 6 is a sectional view of the indicator of Fig. 5 along the line 6—6 of Fig. 5.

Figs 5 and 6 illustrate another type of indicator. A sheet 24 is shaped to present at one of its ends a raised platform 25 containing an annular groove 26. Prior to shaping, the sheet is printed with appropriate instructions on the area generally indicated at 27, and colored a suitable color over that area which lies at the base of annular groove 26. Groove 26 is then filled with an emulsion 29, and a transparent sheet 28 fastened to platform 25 over groove 26.

From the foregoing, it will be apparent that an extremely simple but highly practical telltale device has been achieved by this invention. The emulsion used may be prepared from edible constituents to eliminate any possibility of food contamination should any leakage occur. The freezing point of any given emulsion may be regulated within wide ranges. The telltale may be made irreversible and, perhaps most important, the telltale device need not be prepared at freezing temperatures to insure proper operation. The emulsion may be prepared at room temperatures, then inserted into the food package, and the entire assembly then subjected to freezing temperatures. Of course, the emulsion should be frozen before it has a chance to break on standing, or if the signal means used for displaying the separation of the emulsion depends on the solution of a dye in an oil phase, then before the dye dissolves in the oil phase to any appreciable extent.

While there has been described only a few embodiments of this invention, it is desired not to be limited thereby, and it is intended to cover all modifications of this invention which would be apparent to one skilled in the art and that come within the scope of the appended claims.

As used herein, "transparent" is used in its ordinary sense as describing the property of being sufficient pervious to light so as not completely to conceal that which lies beyond.

"Thaw," as used in the specification and claims, means transformation of a substance from a solid to a liquid state by elevation of temperature above the melting point of the substance and includes temperatures other than 32° F. in the case of substances other than water.

I claim:

1. A thermosensitive telltale device adapted to be frozen at a predetermined temperature and denoting after freezing the occurrence of a temperature rise which comprises a semi-opaque to opaque unfrozen emulsion formed of immiscible liquids, said emulsion having the property on a freeze-thaw cycle of breaking down and separating into continuous liquid phases at temperatures above said predetermined temperature and signal means associated therewith which is rendered operably effective as a telltale sign at the end of said freeze-thaw cycle by virtue of the formation of said continuous liquid phases.

2. A thermosensitive telltale device for denoting the occurrence of a temperature rise which comprises a frozen emulsion having semi-opaque to opaque characteristics and being formed of constituents which on thawing are immiscible liquids, said emulsion breaking on thawing and separating into continuous liquid phases, and a dye stuff dispersed through one of the constituents of said emulsion, said dye stuff being selectively soluble in another of the constituents and dissolved thereby upon thawing of the emulsion and separation thereof into continuous liquid phases.

3. The thermosensitive device of claim 3 wherein the liquids making up the emulsion and the dye stuff are edible.

4. A thermosensitive telltale device adapted to be frozen at a predetermined temperature and denoting after freezing the occurrence of a subsequent temperature rise which comprises an unfrozen emulsion having semi-opaque to opaque characteristics, said emulsion being formed of immiscible liquids, at least one of which freezes at temperatures below said predetermined temperature, said emulsion having the property of breaking readily on a freeze-thaw cycle so as to separate into continuous liquid phases on thawing of the emulsion at temperatures above said predetermined temperature, and a dye stuff dispersed through and insoluble in one of the liquids of said emulsion which is soluble in another liquid of said emulsion but not instantly soluble.

5. The thermosenstive device of claim 4 wherein the liquids making up the emulsion are edible.

6. The thermosensitive device of claim 5 wherein the emulsion is an oil in water emulsion.

7. A telltale device for indicating thawing of a freezable material and adapted to be frozen with the material, said device comprising, at atmospheric temperatures, a visually distinctive surface, and an emulsion having semi-opaque to opaque characteristics covering and obscuring said visually distinctive surface, said emulsion having the property of being rendered substantially transparent by freezing and thawing of the emulsion thus to reveal the visually distinct surface.

8. A thermosensitive device adapted to be frozen at a predetermined temperature and denoting after freezing the occurrence of a subsequent temperature rise which comprises an unfrozen emulsion having semi-opaque to opaque characteristics, said emulsion being formed of substantially transparent liquids, at least one of which freezes at temperatures below said predetermined temperature, said emulsion being broken by a freeze-thaw cycle so as to separate into continuous liquid phases pervious to light upon thawing of the emulsion at temperatures above said predetermined temperature, and a visually distinctive surface covered by said emulsion and obscured thereby, said surface being rendere discernible upon breaking of the emulsion into said continuous phases.

9. The thermosensitive device of claim 8 wherein the liquids making up the emulsion are edible.

10. The thermosensitive device of claim 8 wherein the emulsion is an oil in water emulsion.

11. A thermosensitive telltale device adapted to be frozen at a predetermined temperature and after freezing denoting the occurrence of a subsequent temperature rise which comprises a closed container, a portion of the inner surface of said container having a visually distinctive surface, said container having a transparent wall portion enabling said surface to be viewed from outside the container, and an emulsion having semi-opaque to opaque characteristics, said emulsion being formed of unfrozen transparent liquids deposited within said container and obscuring said surface, said emulsion having the property of breaking on a freeze-thaw cycle so as to separate into continuous liquid phases substantially transparent at temperatures above said predetermined temperature, said visually distinctive surface being rendered discernible upon breaking of the emulsion into said continuous phases.

12. A thermosensitive telltale device for denoting the occurrence of a temperature rise which comprises an emulsion having semi-opaque to opaque characteristics, said emulsion being formed of constituents which in their normal states are substantially transparent to light, said emulsion breaking on thawing and separating into continuous liquid light-transmitting phases, and a visually distinctive surface covered by the frozen emulsion and obscured thereby, said surface being rendered discernible upon breaking of the emulsion into said continuous liquid phases.

References Cited in the file of this patent

UNITED STATES PATENTS

| 1,535,536 | MacDonald | Apr. 28, 1925 |
| 2,460,215 | Chase | Jan. 25, 1949 |
| 2,560,537 | Andersen | July 17, 1951 |
| 2,662,018 | Smith | Dec. 8, 1953 |